(12) United States Patent
Hoff et al.

(10) Patent No.: US 7,975,259 B2
(45) Date of Patent: Jul. 5, 2011

(54) VERIFICATION OF CUSTOMIZATION RESULTS

(75) Inventors: Roland Hoff, Walldorf (DE); Michael Welling, Walldorf (DE)

(73) Assignee: SAP AG, Walldorf (DE)

( * ) Notice: Subject to any disclaimer, the term of this patent is extended or adjusted under 35 U.S.C. 154(b) by 1019 days.

(21) Appl. No.: 11/809,513

(22) Filed: Jun. 1, 2007

(65) Prior Publication Data
US 2008/0301645 A1    Dec. 4, 2008

(51) Int. Cl.
  *G06F 9/44*  (2006.01)
(52) U.S. Cl. ....................................................... 717/126
(58) Field of Classification Search ........... 717/124–135
  See application file for complete search history.

(56) References Cited

U.S. PATENT DOCUMENTS

| | | | |
|---|---|---|---|
| 6,802,055 B2 * | 10/2004 | Jade et al. ..................... | 717/130 |
| 6,871,232 B2 | 3/2005 | Curie et al. | |
| 7,139,798 B2 | 11/2006 | Zircher et al. | |
| 7,366,460 B2 | 4/2008 | O'Farrell et al. | |
| 7,430,410 B2 | 9/2008 | Iwatsu et al. | |
| 7,546,359 B2 | 6/2009 | Tierney et al. | |
| 7,831,465 B2 | 11/2010 | Hoff | |
| 2002/0055956 A1 | 5/2002 | Krasnoiarov et al. | |
| 2002/0133392 A1 | 9/2002 | Angel et al. | |
| 2002/0152210 A1 | 10/2002 | Johnson et al. | |
| 2002/0156812 A1 | 10/2002 | Krasnoiarov et al. | |
| 2003/0009536 A1 | 1/2003 | Henderson et al. | |
| 2004/0093397 A1 | 5/2004 | Chiroglazov et al. | |
| 2005/0060371 A1 | 3/2005 | Cohen et al. | |
| 2005/0108041 A1 | 5/2005 | White | |
| 2005/0257203 A1 * | 11/2005 | Nattinger ....................... | 717/154 |
| 2006/0075024 A1 | 4/2006 | Zircher et al. | |
| 2006/0095476 A1 | 5/2006 | Dauer et al. | |
| 2006/0136784 A1 * | 6/2006 | Prescott et al. ................. | 714/38 |
| 2006/0225041 A1 * | 10/2006 | Girolami-Rose ............. | 717/124 |
| 2006/0242194 A1 * | 10/2006 | Tsyganskiy et al. ...... | 707/103 R |
| 2006/0293935 A1 * | 12/2006 | Tsyganskiy et al. .............. | 705/7 |
| 2006/0294158 A1 * | 12/2006 | Tsyganskiy et al. .......... | 707/202 |
| 2007/0226032 A1 | 9/2007 | White et al. | |
| 2007/0282650 A1 | 12/2007 | Jackness et al. | |
| 2007/0283287 A1 | 12/2007 | Taylor et al. | |
| 2008/0195429 A1 | 8/2008 | Hoff | |
| 2008/0319777 A1 | 12/2008 | Hoff | |

FOREIGN PATENT DOCUMENTS

| | | |
|---|---|---|
| EP | 1571541 A2 | 9/2005 |
| EP | 1635287 A1 | 3/2006 |

OTHER PUBLICATIONS

Hoijin Yoon, "Inter-calss Test Technique between Black-box-class and White-box-class for Component Customization Failures," 1999, IEEE, p. 162-165.*

* cited by examiner

*Primary Examiner* — Anna Deng
(74) *Attorney, Agent, or Firm* — Brake Hughes Bellermann LLP

(57) ABSTRACT

Objects associated with a business document and one or more functions associated with the production of the objects may be determined. An object associated with an unexpected result in the business document may be selected. A function associated with the object may be selected, the function being associated with one or more custom settings. One or more steps, based on the custom settings, used in producing the selected object and associated with the selected function may be determined and provided in a result view.

18 Claims, 6 Drawing Sheets

VERIFICATION OF CUSTOMIZATION RESULTS

TECHNICAL FIELD

This description relates to the evaluation of results of customizations to a software application.

BACKGROUND

As different users of an application may have different needs, flexible software packages may be customized to meet the needs of many different users. However, the more a standard software package or application is customized by a particular user, the greater the likelihood that the customizations may result in unexpected output when executed by the software application. For example, an application with 100 customization steps may have a greater likelihood of generating unexpected output versus an application with only 10 customization steps.

Additionally, the more an application is customized, the more difficult it may be for a consultant, developer or other user or support personnel (hereinafter, referred to as developer) to determine where or which customization step may be responsible for generating the unexpected output. Thus, more customizations may result in a greater number of customization steps that a developer needs to parse through to determine the source of the unexpected output.

For example, the application, as a result of the customizations, may output one or more documents. Then, for example, a developer or other user may determine that there is unexpected output in one or more of the documents. At that point it may be difficult and time-intensive for a developer to try and determine precisely which customization step was responsible for producing the unexpected output, especially in the case of a large number of customization steps.

SUMMARY

According to an example embodiment, a method is provided. For each object of a plurality of objects associated with a business document produced by an application, at least one function used in the production thereof may be determined. A selected object of the plurality of objects may be received, the selected object being associated with an unexpected result in the business document. A selected function associated with the selected object may be received, the selected function being associated with one or more custom settings. One or more steps, based on the one or more custom settings associated with the selected function, used in producing the selected object may be determined. A result view including the one or more steps used to produce the unexpected result may be provided.

According to an example embodiment, a system is provided. A selection view generator may be configured to provide a plurality of objects of a business document including an unexpected result as produced by an application, in association with one or more functions of the application used in the production thereof based on one or more custom settings. A simulator may be configured to simulate one or more steps used the production of one or more selected objects of the plurality of objects associated with the unexpected result based on the custom settings and a selection of one or more of the functions. A result view generator may be configured to provide the one or more steps. A maintenance view generator may be configured to provide, upon a selection of a first step, a maintenance view for modifying a first custom setting of the one or more custom settings that is associated with the first step.

According to an example embodiment, an interface is provided. Machine executable instructions may be stored on a computer-readable medium that, when executed on a data processing apparatus, are configured to cause the data processing apparatus to provide the interface with multiple views. The interface may include a selection view including one or more objects of a business document produced by one or more functions of an application operable based on one or more custom settings, the one or more functions of the application associated with producing the one or more objects. The interface may be configured to receive a selected object of the one or more objects and a selected function of the one or more functions and provide a result view including one or more steps associated with producing the selected object based on the custom settings associated with the selected function. The interface may be configured to receive a selected step of the one or more steps and provide a maintenance view configured to provide for a modification of the custom settings associated with the selected step.

The details of one or more implementations are set forth in the accompanying drawings and the description below. Other features will be apparent from the description and drawings, and from the claims.

DETAILED DESCRIPTION

Figure 1:
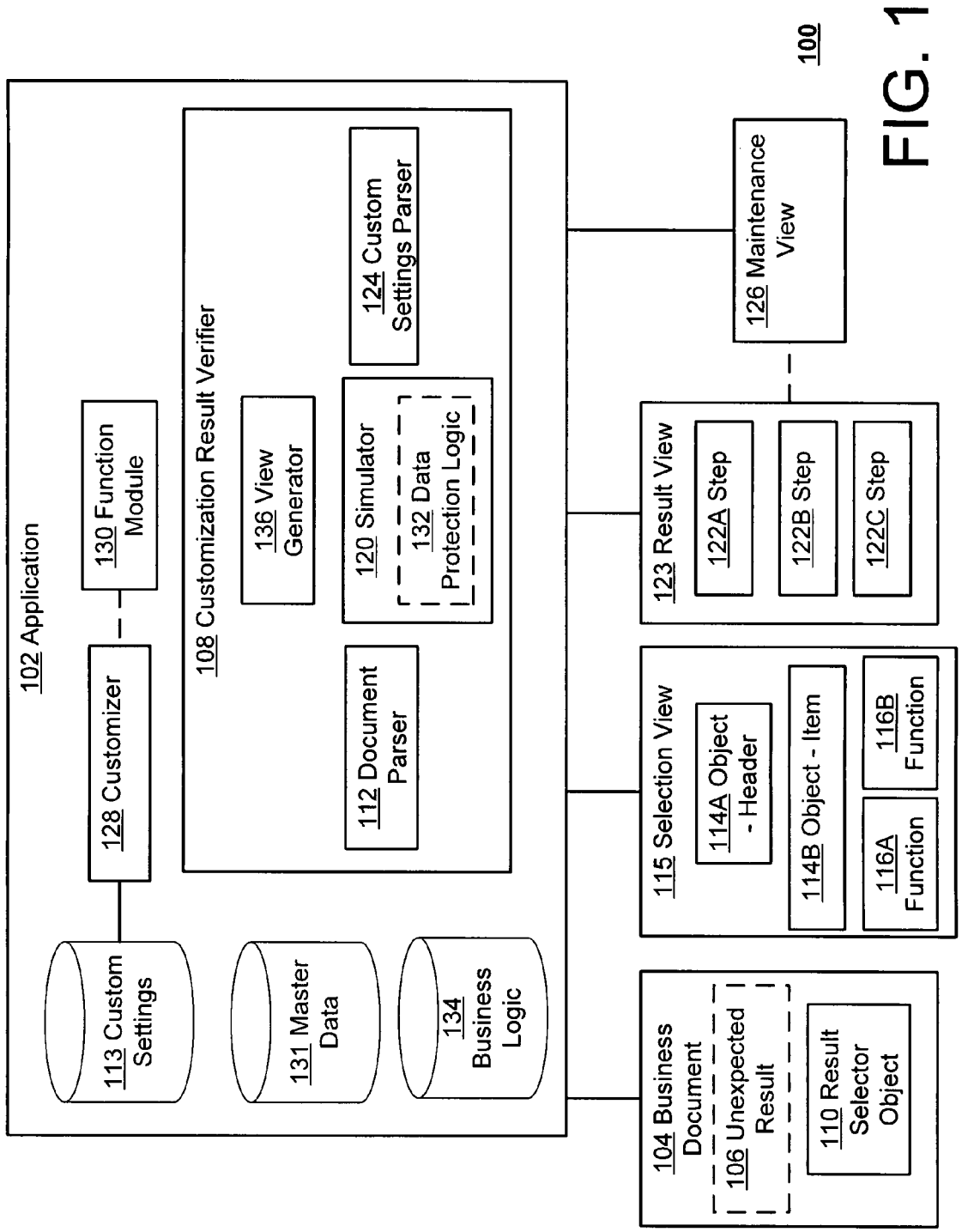
FIG. 1 is a block diagram of an example system for verifying results of customizations to an application, according to an example embodiment.

FIG. 1 is a block diagram of an example system 100 for verifying results of customizations to an application (e.g., an application 102), according to an example embodiment. In the example of FIG. 1, the system 100 allows a user to quickly and easily locate a customization setting(s) that resulted in an unexpected output of the software application 102. In this way, the user may more quickly locate and correct any errors in the customization setting(s).

For example, upon a determination that a document 104 output by a customized application, such as the application 102, may include an unexpected result 106, the system 100 may parse the document 104 into a plurality of sections. Then, for example, a user may designate relevant aspects of the document 104 and/or the parsed sections thereof, and the system 100 may then provide a summary of computations or other actions performed by the application 102 in producing the unexpected result 106. The user may then, for example, be able to quickly identify and correct the computation(s), if any, that may be associated with producing the unexpected result 106.

While the system 100 may be described below with reference to the unexpected result 106 including a result unexpected or unanticipated by the user, it may be understood that in other examples, a result may be expected by the user (yet the user may wish to verify or understand the result), or the user may observe a result and be unsure whether the result is expected or unexpected. Thus, for example, the user may verify how the (potentially) unexpected result 106 was generated by the system 100. According to an example embodiment, the system 100 may be used to train users on how to recognize when a result (e.g., unexpected result 106) is properly produced or generated.

As just referenced, the system 100 may include the application 102 that may produce, generate or otherwise output one or more documents, or portions thereof, such as the document 104, based on some customized settings and/or functionality. For example, the application 102 may include standard software that is customizable based on a user's preferences and/or needs. It may be one or more of the customizations to the application 102 that may be responsible for generating the unexpected result 106 in the document 104, as discussed above.

According to an example embodiment, the application 102 may include a customer relationship management (CRM) or enterprise resource planning (ERP) application that includes customizable base functionality that may be customized or otherwise modified to suit a user's needs, including generating reports or other documents as specified by the user. Of course, virtually any other customizable software application is contemplated, as well.

As discussed above, the application 102 may output or otherwise generate the document 104, which may be a business document, including the unexpected result 106. The business document 104 may include, or may reference, virtually any output or result generated by the application 102. For example, the business document 104 may include a spreadsheet, invoice, form, receipt or other document related to a business transaction. As discussed above, the business document 104 may be generated by the application 102 as being customized per a user's specification, whereby one or more of these customizations may be responsible for generating the unexpected result 106. For example, a user may specify which fields or values are to be included in the business document 104, and how the fields or values may be determined or generated, wherein, for example, one of the fields may be incorrect, or may include an incorrect value (e.g., the unexpected result 106).

The unexpected result 106 may include any data or values included in (or omitted from) the business document 104, as generated by a customized application, that may have been unanticipated, incorrect, improper or otherwise unexpected by a user. For example, the application 102 may generate a plurality of results based on one or more customizations to the application 102, and provide the results in the business document 104. Then, for example, a user may determine from the business document 104, that at least one of the plurality of results is unexpected, e.g., that the business document 104 includes the unexpected result 106.

The system 100 may then allow the user to verify whether or not the unexpected result 106 was correctly generated by the customized application 102 via a customization result verifier 108. The customization result verifier 108 may parse the business document 104 and simulate a related performance of the application 102, as customized, and may provide the calculations and/or other actions performed by the application 102 in generating the unexpected result 106. A user may then determine which action or calculation, if any, was directly responsible for producing the unexpected result 106. The customization result verifier 108 may then allow the user to modify (e.g., fix) the portion of the customizations responsible for generating the unexpected result 106 in the business document 104.

According to an example embodiment, the business document 104 may include, or be associated with, a result selector object 110. The result selector object 110 may include an object that, when selected or activated, calls or otherwise initiates the customization result verifier 108 for the associated business document 104. For example, the business document 104 may include the result selector object 110 as a selectable button or other icon, the selection of which causes the customization result verifier 108 to parse the business document 104, as described herein. Or, for example, the result selector object 110 may include a separate program or application whereby the business document 104, or an identification of the business document 104, is provided to the result selector object 110 which then provides the business document 104 to the customization result verifier 108.

The customization result verifier 108 may include, for example, a number of components that perform the above described functionality. Examples of such components are provided, although the examples are not exhaustive, and, further, it will be appreciated that some components may be omitted or combined. For example, the customization result verifier 108 may include a document parser 112. The document parser 112 may parse the business document 104 to determine what output was included in the business document 104, and what functionality was used by the application 102 in generating the output, including the unexpected result 106. The document parser 112, in addition to (or in lieu of) parsing the business document 104, may, for example, parse the customizations to the application 102 to determine which functionality was used to generate the results included in the business document 104.

The customizations to the application 102 may be included in custom settings 113. The custom settings 113 may include customizations to the application 102 and/or one or more functionalities of the application 102. For example, the custom settings 113 may include program code, algorithms or other modifications to be performed by the application 102 during the generation of the business document 104, including the unexpected result 106.

As a result of the parsing, the document parser 112 may return or otherwise determine objects 114A and 114B. The objects 114A and 114B may include one or more portions of the business document 104 or the entire business document 104, including results output by the application 102 as included in the business document 104. For example, the business document 104 may include a header and one or more items associated with the header, wherein at least one of the header and/or the items includes the unexpected result 106. Then, for example, the document parser 112 may determine from parsing the business document 104, a header object 114A associated with the header and an item object 114B associated with each of the items. A user may then determine and select, from a selection view 115, whichever of the objects 114A, 114B is associated with the unexpected result 106, in order to further determine how the selected object (e.g., the unexpected result 106) was generated.

The selection view 115 may include an interface, or a portion thereof, configured to display the result of the document parser 112 for selection. For example the selection view 115 may include the objects 114A and 114B, whereby a user may select which of the objects 114A, 114B include the unexpected result 106 to determine more precisely how the unexpected result 106 was generated.

The selection view 115 may also include one or more selectable functions 116A, 116B. The functions 116A and 116B may include functionality of the application 102 used to generate one or more of the objects 114A, 114B, including the unexpected result 106. For example, the document parser 112 may determine that the functions 116A, 116B are associated with generating one or more of the objects 114A, 114B as included in the business document 104. Or, for example, upon a specific selection of one or more of the objects (e.g., 114A, 114B) from the selection view 115, the document parser 112 may determine only those functions (e.g., 116A, 116B) are associated with generating the selected object(s), rather than determining all the functions associated with generating any or all of the objects associated with the business document 104. The resultant functions (e.g., 116A and 116B), as determined by the document parser 112, may then be provided in the selection view 115. In other example embodiments, the functions 116A and 116B may include one or more functions associated with the application 102 or the objects 114A, 114B in a more general sense (e.g., in other contexts or documents), but not actually used to generate or produce the objects 114A or 114B. For example, such associated functions may be functions which should have been used to generate the objects 114A, 114B, but which were inadvertently omitted.

The selection view 115 may provide the objects 114A and 114B in association with the functions 116A and 116B. Then for example, from the selection view 115, a user may then select an object 114A, 114B (or a plurality of objects 114A, 114B) and a function 116A, 116B (or a plurality of functions 116A, 116B) the user suspects or knows to be associated with the unexpected result 106.

Upon receiving a user's selections of an object (e.g., 114A, 114B) and a function (e.g., 116A, 116B) associated with the unexpected result 106 from the selection view 115, a simulator 120 may simulate at least a portion of a performance of the application 102 based on the custom settings 113 and associated with the selected object and selected functions. For example, the simulator 120 may recreate, re-execute, or otherwise simulate a performance of those portion(s) of the custom settings 113 associated with generating the selected object with the selected function. Then, for example, the simulator 120 may determine, as a result of the simulation, one or more steps 122A-C performed by the application 102 in determining the selected object(s) using the selected function(s) based on the custom settings 113.

The steps 122A-C may include one or more actions or calculations showing how the selected function, from the selection view 115, was used by the application 102 to generate the selected object, based on the custom settings 113. For example, the steps 122A-C may include a data flow of data used and/or modified by the selected function based on the customizing settings 118. For example, the step 122A may include the retrieval of data from a database or other system, the step 122B may include the processing of the data by the function 116A according to the custom settings 113, and the step 122C may include the result of the processing (e.g., unexpected result 106) as included in the object 114B. A user may then, for example, review the steps 122A-C in a result view 123 to determine where the problem may be which led to the unexpected result 106.

The result view 123 may include an interface, or a portion thereof, configured to display the steps 122A-C. One or more of the steps 122A-C provided in the result view 123 may be associated with a link to the corresponding portion of the custom settings 113 associated with the step 122A-C. For example, step 122A may include retrieving a price of a product from a database and multiplying the price by 0.80 to determine a sales price. Then, for example, in reviewing the steps 122A-C in the result view 123, a user may determine that there is a problem with the result of the multiplication, in that the sales price was to be 0.85 rather than 0.80. Then, for example, the user may select the step 122A in the result view 123 and may be provided with the portion of the custom settings 113, as determined by a custom settings parser 124 and provided in a maintenance view 126, where the 0.80 was used as a multiplier for the sales price.

In another example embodiment, the steps 122A-C in the result view 123 may not be associated with links to the corresponding portion of the custom settings 113. Then for example, upon viewing the steps 122A-C in the result view 123, a user may later or separately modify the custom settings 113 based on the steps 122A-C. The links, however, may be provided to the user as a shortcut to perform whatever modifications to the custom settings 113 that may be necessary.

The custom settings parser 124 may parse the custom settings 113 based on the step (e.g., 122A-C) selected from the result view 123. For example, the custom settings parser 124 may determine which portion of the custom settings 113 is associated with the selected step and provide the portion for the maintenance view 126. In continuing the incorrect sales price example above, the custom settings parser 124 may provide the portion of the custom settings 113 associated with the sales price being set to 0.80 in the maintenance view 126.

Thus, the maintenance view 126 may include an interface, or portion of an interface, configured to provide at least a portion of the custom settings 113 as associated with one or more of the steps 122A-C. The maintenance view 126, further, may allow a user to modify the custom settings 113, such that upon a subsequent execution of the application 102 the results as provided in the business document 104, including the unexpected result 106 may change. For example, in continuing the incorrect sales price example above, via the maintenance view 126, a user may correct the sales price multiplier to read 0.85 rather than 0.80, such that upon a subsequent execution of the application 102, the 0.85 value will be used producing the business document 104, and thus may change the unexpected result 106.

The maintenance view 126 may be provided as part of, or separate from, a customizer 128. The customizer 128 may be used to set and/or modify the custom settings 113 for the application 102. For example, the customizer 128 may include an editing program or compiler that allows for the modification of the custom settings 113 or other program code associated with the application 102. The customizer 128 may be a built-in functionality of the application 102, or may be separate from the application 102 but may still allow for a modification of the custom settings 113 thereof. The maintenance view 126 may be an interface of, or separate from the customizer 128, but may also still allow for modification of the custom settings 113.

A function module 130 may include one or more of the functions (e.g., 116A-B) used or modified by the custom settings 113. For example, the function module 130 may include a container, library or other storage, and/or may include or reference executable code for, functions of the application 102. The custom settings 113 may then, for example, call and/or modify one or more of the functions of the function module 130.

The master data 131 may include a database or other storage or memory unit containing data used and/or modified by the application 102. For example, the master data 131 may include the regular price and sales price of a particular item of merchandise, whereby the sales price may be adjusted during a performance of the application 102 depending on the day of the week on which a purchase is being made. According to an example embodiment, the master data 144 may be stored in one or more other systems or programs accessed by the application 102, and perhaps accessed by other applications, as well.

Data protection logic 132 may prevent changes to any data (or to the business document 104) during a simulation by the simulator 120. The data protection logic 132 may maintain the data integrity by suppressing certain aspects of the function module 130, or by duplicating relevant portions of the function module 130 and then only using such duplicated portions for the simulation(s). For example, the data protection logic 132 may read or otherwise parse the custom settings 113 and/or function module 130 and determine which function calls change the master data 131, then the data protection logic 132 may disable or replace these function calls for a simulation to make sure the master data 131 is not changed by the simulator 120. Or, for example, the data protection logic 132 may disable a save feature of the master data 131, such that any changes made are not saved. As just referenced, and according to another example embodiment, the data protection logic 132 may perform a similar function with regard to data provided in the business document 104.

The application 102, in addition to including the function module 130, may include business logic 134. The business logic 134 may include basic or core functionality of the application 102. For example, the application 102 may be operable without any of the custom settings 113 and may operate based on the business logic 146 and the (non-customized versions) of the function module(s) 130. Then, for example, after addition of the custom settings 113, the application 102 may be operable based on both the custom settings 113 and the business logic 146. Or, for example, the business logic 134 may include one or more templates for standard business documents (e.g. 104).

As discussed above, the customization result verifier 108 may provide output via the selection view 115, result view 123 and/or maintenance view 126, some or all of which may be generated by a view generator 136. The view generator 136 may be configured to receive results from the document parser 112, simulator 120 and custom settings parser 124, and output or otherwise provide the selection view 115, result view 123 and maintenance view 126, respectively, which may or may not be part of one interface. According to an example embodiment, a selection view generator, a result view generator and a maintenance view generator configured to generate the selection view 115, the result view 123 and the maintenance view 126, respectively, may be provided as components of and/or separate from the view generator 136.

Thus, the system 100 may allow a user to identify an unanticipated output from one or more documents output by the application 102. The system 100 may then allow for the user to select the portions of the document(s) including the unexpected result 106, quickly view how that output was generated by the application 102 and fix any errors in the computation of the output.

Figure 2B:
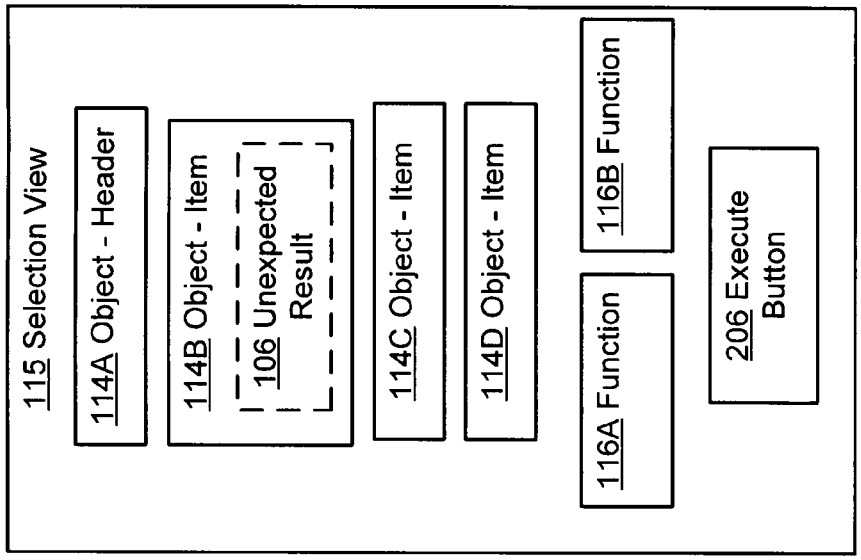
FIGS. 2 A-D are block diagrams of an example interface(s) of the system of FIG. 1, according to an example embodiment.
Figure 2A:
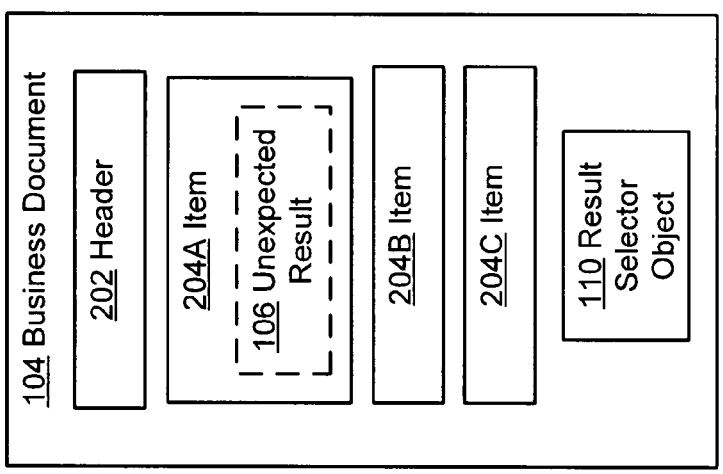

FIGS. 2A-D are block diagrams of an example interface(s) of the system 100, according to an example embodiment. FIG. 2A is a block diagram of a business document 104, according to an example embodiment. The business document 104 includes a header 202, a plurality of items 204A-C associated with the header, and the result selector 110.

The header 202 may include a portion of the business document that describes the business document 104 as a whole and/or the items 204A-C of the business document 104 associated with the header 202. The header 202 may be the result of one or more actions or computations as performed by an application (e.g., 102) based on custom settings (e.g. 118). In other example embodiments, the business document 104 may include a plurality of headers 202.

The items 204A,B,C may include the result of one or more actions or computations as performed by an application (e.g., 102) based on custom settings (e.g. 118). For example, the item 204A may be generated based a function (e.g., 116A) as customized based on the custom settings. Each item 204A-C, may include one or more data values produced by the application. According to an example embodiment, a user may identify that a data value in the item 204A includes the unexpected result 106.

Upon determining the existence of the unexpected result 106, the user may select or otherwise activate the result selector object 110, which may be a button on the business document 104. That is, the result selector object 110 may be embedded or included directly in the application 102, thus providing a user with a direct access point to determine, access, and modify relevant customization settings. In some example embodiments, the result selector object 110 may be provided in a role or identify-based manner. For example, an administrator may be provided with the result selector object when accessing the document 104, while the result selector object 110 may be hidden from an ordinary user of the document 104 who may not have privileges to modify the custom settings 113.

FIG. 2B is a block diagram of a selection view 115, according to an example embodiment. The selection view 115 may include a selection view generated based on activating the result selector object 110 of FIG. 2A. The selection view 115 includes a header object 114A corresponding to the header 202 of the business document 104 and item objects 114B-C corresponding to the items 204A-C, wherein item 114B includes the unexpected result 106. In other example embodiments, there may not be a direct correlation between the number of items (e.g., header 202, items 204A-C) included in the business document and the number of objects (e.g., object header 114A, item objects 114B-D) included the selection view 115.

The selection view 115 may also provide the functions 116A-B used to generate the objects 114A-D. A user may select one or more of the objects 114A-D and one or more of the functions 116A-B for further analysis. For example, a user may select the item object 114B including the unexpected result 106 and the function 116A and press an execute button 206. The execute button 206 may include any object or icon, including a menu item, used to denote that a user has made one or more selections from the selection view 115.

Figure 2D:
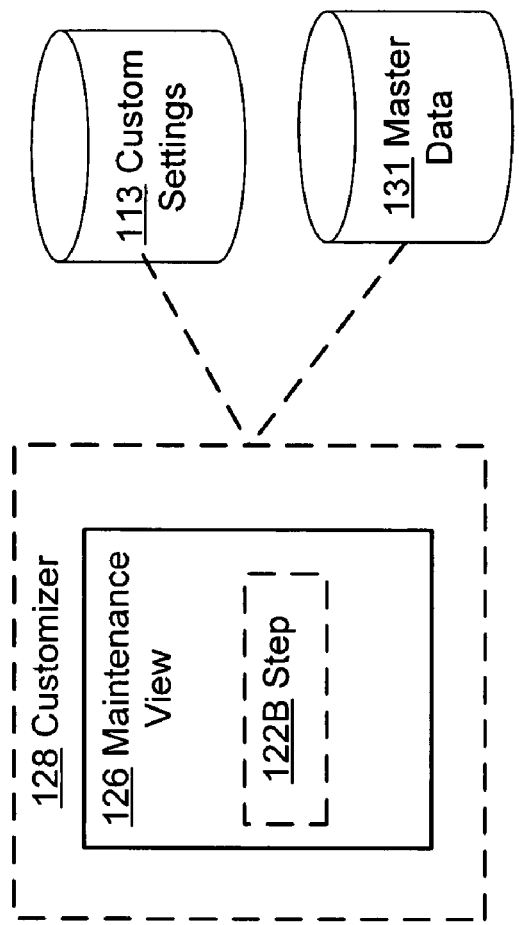
Figure 2C:
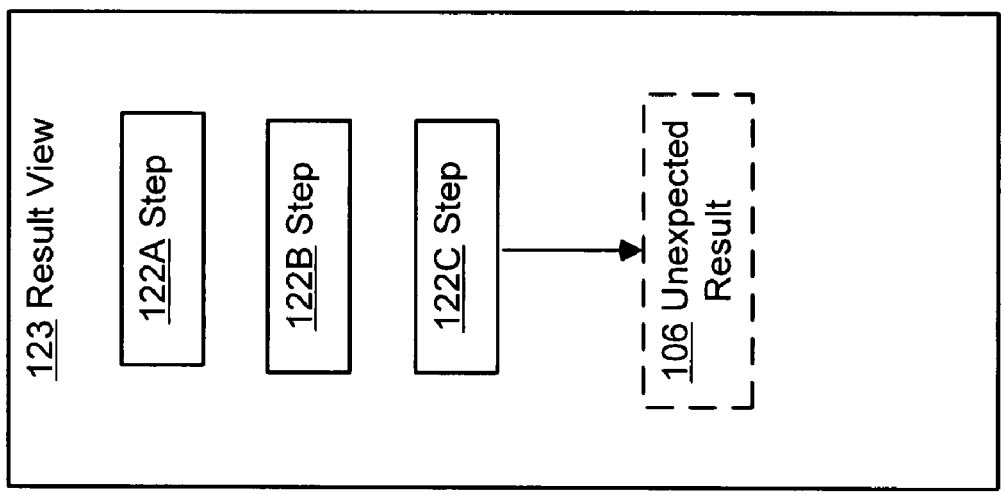

FIG. 2C is a block diagram of a result view 123, according to an example embodiment. The result view 123 may be generated based upon pressing the execute button 206 of FIG. 2B. The result view 123 may provide a plurality of steps 122A-C used to generate the unexpected result 106 from the item object (e.g., 114B) as selected from the selection view (e.g., 115) of FIG. 2B. Then for example, based on the result view 123, a user may determine that there is a problem with the step 122B and may select the step 122B.

FIG. 2D is a block diagram of a maintenance view 128, according to an example embodiment. The maintenance view 128 may be generated based upon a selection of step 122B of FIG. 2C. The maintenance view 128 may or may not be part of the customizer 128, and may include custom settings 113 and/or master data 131 associated with the selected step (e.g., 122B). Then, for example, a user may modify the custom settings 113 and/or master data 131 associated with the selected step such that upon a subsequent execution of the application, the unexpected result 106 may be changed.

Figure 3:
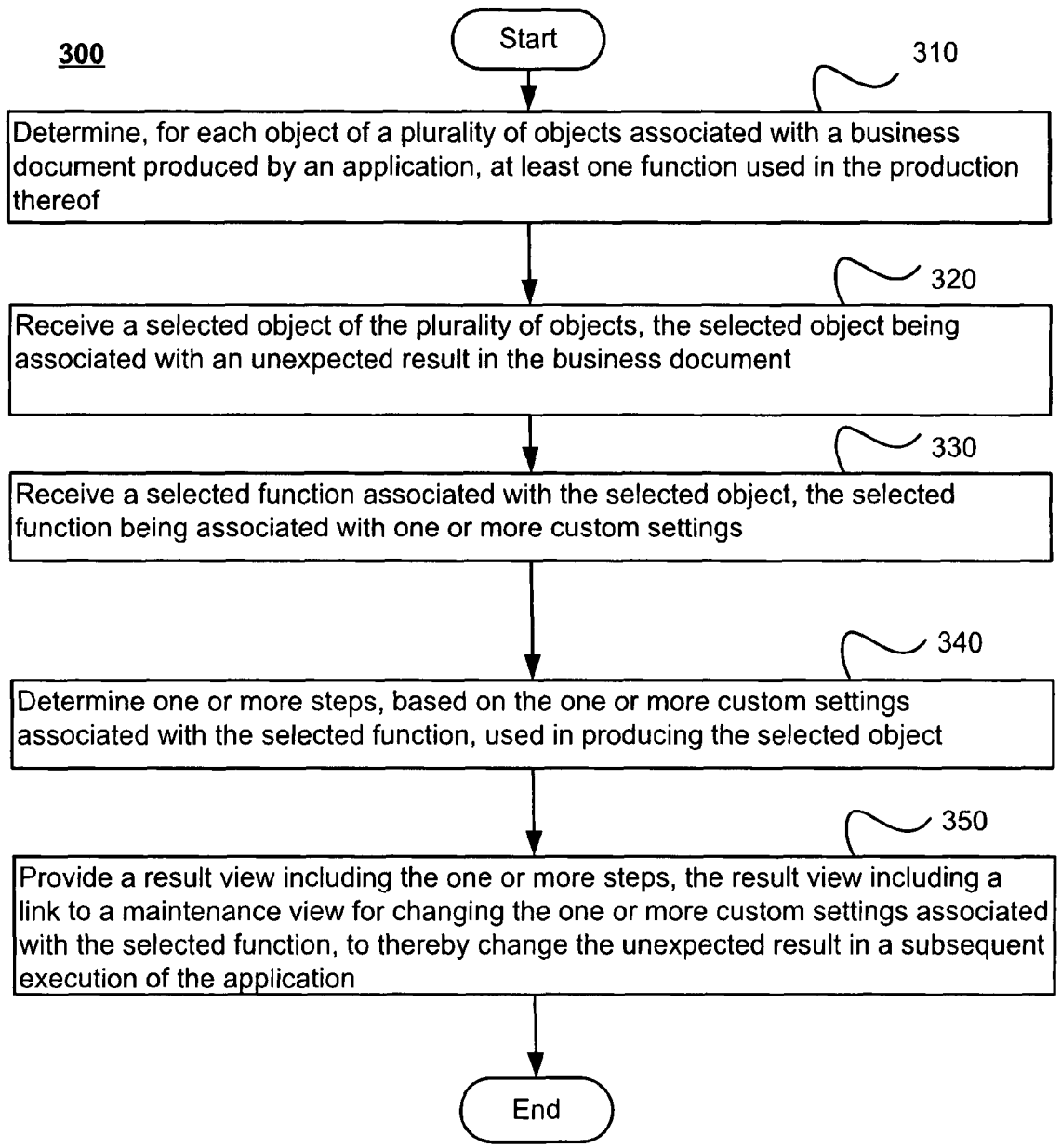
FIG. 3 is a flowchart illustrating example operations of the system of FIG. 1.

FIG. 3 is a flowchart 300 illustrating example operations of the system of FIG. 1. More specifically, FIG. 3 illustrates an operational flow 300 representing example operations related to customization result verification.

After a start operation, for each object of a plurality of objects associated with a business document produced by an application, at least one function used in the production thereof may be determined (310). For example, as shown in FIG. 1, the document parser 112 may determine the header object 114A and item object 114B from the business document 104. Then, for example, the functions 116A and 116B are determined by the document parser 112 as being used to produce one or more of the objects 114A, 114B (or results or values thereof).

A selected object of the plurality of objects may be received, the selected object being associated with an unexpected result in the business document (320). For example, the objects 114A and 114B are provided in the selection view 115, whereby one or more of the objects 114A and 114B may be selected. For example, the item object 114B may be associated with the unexpected result 106 from the business document 104 and may be selected. Then, for example, the simulator 120 may receive the selected object (e.g., 114B). In another example embodiment, the document parser 112 may receive the selected object and then determine what functions (e.g., 116A, 116B) were used to produce the selected object.

A selected function associated with the selected object may be received, the selected function being associated with one or more custom settings (330). For example, the function 116A may be selected from the selection view 115, whereby the function 116A may be associated with the custom settings 113. For example, the simulator 120 may receive the selected function and selected object. According to another example embodiment, a request handler (not shown) may receive the selected function and selected object. Then for example, the request handler may provide the selections to the simulator 120.

One or more steps, based on the one or more custom settings associated with the selected function, used in producing the selected object may be determined (340). For example, the simulator 120 may determine the steps 122A-C based on the custom settings 113 associated with the selected function (e.g., 116A, 116B).

A result view including the one or more steps may be provided, the result view including a link to a maintenance view for changing the one or more custom settings associated with the selected function, to thereby change the unexpected result in a subsequent execution of the application (350). For example, the result view 123 may include the steps 122A-C as determined by the simulator 120. Then for example, the steps 122A-C, as provided in the result view 123, may be selectable, whereby upon a selection of a step (e.g., 122A, 122B, 122C), the maintenance view 126 may be provided. The maintenance view 126 may allow the custom settings 113 to be changed, and may provide that portion of the custom settings 113 associated with the selected step (e.g., 122A, 122B, 122C). Then for example, a modification of the custom settings 113 via the maintenance view 126 may result in the unexpected result 106 being different in a subsequent execution of the application 102.

Figure 4:
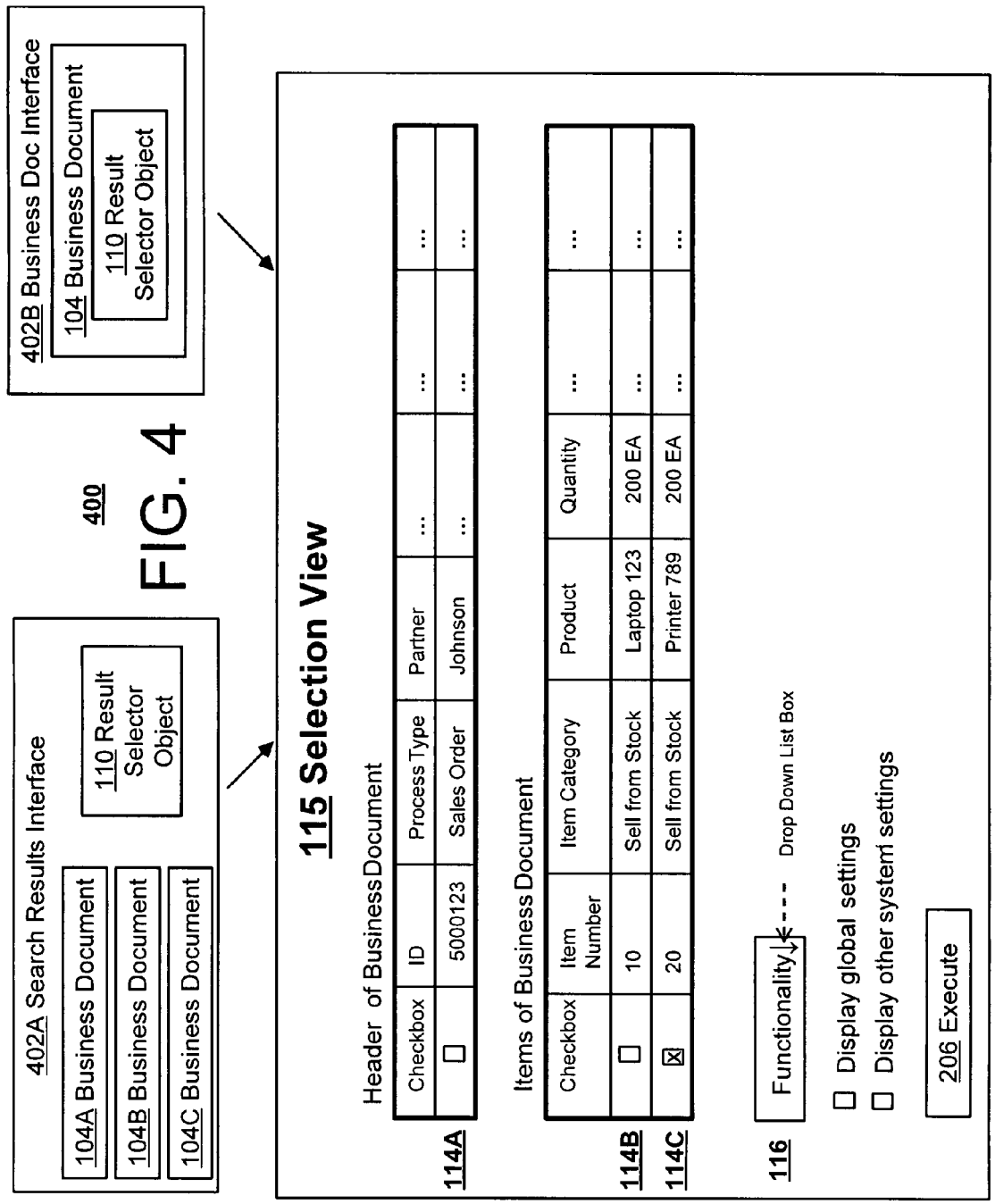
FIG. 4 is a block diagram of an example interface(s) for verifying results of customizations to an application, according to an example embodiment.

FIG. 4 is a block diagram of an example interface(s) 400 for verifying results of customizations to an application, according to an example embodiment. The system 400 includes one or both of two interfaces 402A and 402B, through which the selection view 115 may be generated. The interfaces 402A, 402B may include one or more screens or views associated with one or more programs or systems displaying resultant information output by one or more of the associated programs or systems. Then for example, a user may view the output resultant information and verify the resultant information and/or otherwise interact with the interfaces 402A, 402B.

For example, the interface 402A may provide a plurality of business documents 104A, 104B and 104C. The plurality of business documents 104A-C may be provided, for example, based on a search for business documents, from a larger set of business documents stored in a system, meeting a certain criteria, such as relating to a particular customer or client. The resultant business documents 104A-C may then be provided in the interface 402A. The resultant business documents 104A-C may include a subset of information from each document, whereby the subject matter or other identifying information associated with each particular document it may be determined based at least in part on the subset of information provided in the interface 402.

Then, for example, based on the interface 402A, a user may select one or more of the business documents (e.g., 104A-C) to further view in more detail. In the example system 400, the business document 104B has been selected, after which the result selector object 110 may be activated.

Upon activation of the result selector object 110, one of two possible actions may be performed. It may be that the selection view 115 may be provided with regards to the selected document (e.g. 104B), as discussed in further detail below. Or it may be that the interface 402B may provide more detailed information about the selected document 104B. The interface 402B may provide a full view of a business document (e.g., 104). For example, the interface 402B may include a full version of the selected business document 104B. As discussed above with regard to the business document 104 of FIG. 1, a user may review the information provided in the business document 104 (via the interface 402B) and may determine that one or more of the results need verification, whereby the user may select the result selector object 110. In other example embodiments, the interface 402B need not be preceded by the interface 402A.

Upon a selection or activation of the result selector object 110, the selection view 115 may be provided with regard to the selected business document (e.g., 104B). As discussed above, the selection view 115 may include one or more selectable header objects (e.g., 114A), item objects 114B and 114C and associated functionality 116.

The header object 114A, as shown in the example of FIG. 4, may include a first 'checkbox' field that may be selected by a user upon the user determining that the header object 114A includes an unexpected result (e.g., 106). The header object 114A may also include an "ID" field that provides an identification of which business document (e.g., 104) the header object 114A and item objects 114B and 114C are associated with. The "Process Type" field may include information about the subject matter or process type of the business document from which the objects (e.g., 114A-C) were determined. Thus, in the example of FIG. 4, the process type "Sales Order" may indicate that the business document was a sales order. The "Partner" field may indicate the name of the customer associated with the business document, thus the customer's name may be "Johnson." In other example embodiments, the header object 114A may include additional and/or different fields.

The item objects 114B and 114C may also include a "Checkbox" field, wherein in the example of FIG. 4, the item 114C is selected. The item objects 114B and 114C may also include an "Item Number" field indicating a sales transaction number associated with each item, an "Item Category" field indicating information about where the a product may be shipped or otherwise sold from, and "Product" field indicating an identification of which product is being sold in the item, and a "Quantity" field indicating how many of the specified product are being sold. In other example embodiments, the item objects 114B and 114C may include additional and/or different fields.

The functionality 116 may include for example, a drop down list box of functions (e.g., 116A and 116B) of the application (e.g., 102) used to generate one or more of the objects 114A-114C. Example functionality 116 may include pricing, organizational data, availability to purchase check, credit check and an incompleteness check. Of course, it should be understood that the functionality 116 may include any number of additional and/or different functionality, and that interface designs, other than those shown may be used. For example, the functionality 116 may be displayed with checkbox or radio button interface elements.

The functionality 116 may also include a "Display global settings" and a "Display other system settings" box which may include functionality 116 that may not be directly responsible for generating the objects 114A-114C, but may be applied throughout a system. For example, a time zone setting or background color may be examples of global settings. The other system settings may include global settings from one or more other systems. For example, a customer relationship management (CRM) system including the customization result verifier 108 may be associated with and/or communicate with an enterprise resource management (ERP) system. Then for example, the ERP system may perform one or more of the functions 116A and 116B, such that the settings of the ERP system may impact the generation of the objects 114A and 114B.

After a selection of the item object 114C and a selection of a functionality 116 (the selected functionality not being shown in the example of FIG. 4), the execute button 206 may be pressed, which may cause processing to be performed based on the selections, as described above, and as described below with respect to FIG. 5.

Figure 5:
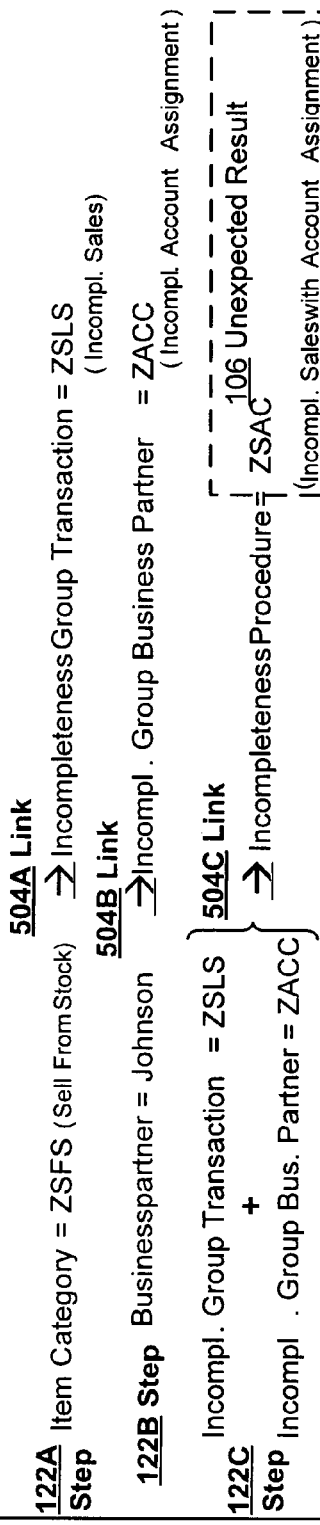
FIG. 5 is another block diagram of an example interface(s) for verifying results of customizations to an application, according to an example embodiment.

FIG. 5 is a block diagram of an example interface(s) 500 for verifying results of customizations to an application, according to an example embodiment. The system 500 includes the result view 123. The result view 123 may include a summary 502. The summary 502 may include a summary of the information provided in the result view 123. For example, the summary 502 may include information such as an identification of the business document processed, ID 5000123, the object(s) selected, Item 20, and the function(s) selected, Incompleteness Check.

Under the "Determination of Incompleteness Procedure" section, the result view 123 may include the steps 122A-C performed to generate the unexpected result 106. For example, in the step 122A, the "item category=ZSFS" may be determined from the master data (e.g., 131). Then for example, the value ZSFS may, based on the custom settings (e.g., 113), be provided to the "incompleteness group transaction" function (e.g., 116A) which may result in a value ZSLS.

In the step 122B, the business partner "Johnson" may be determined from the master data and provided to the "Incompleteness Group Business Partner" function based on the custom settings to result in the value ZACC.

In step 122C, the two earlier determined values ZSLS and ZACC from the steps 122A and 122B may be combined and provided to the "Incompleteness Procedure" and result in a value ZSAC, which may correspond to the unexpected result 106 as included in Item 20 (e.g., 114C) of the business document 5000123 (e.g., 104).

The steps 122A-C may include links 504A-C to a maintenance view (e.g., 126) whereby the custom settings (e.g., 118) associated with the step from which the link was selected may be modified. For example, a selection of the link 504B may result in the maintenance view displaying custom settings associated particularly with the step 122B.

The result view 123 may also include a function definition 506 under the section "Definition of Incompleteness Procedure ZSAC". The function definition 506 may include a definition or summary of the function(s) selected and displayed in the result view 123. The function definition 506 may be derived from the custom settings 113, and similar to the steps 102A-C, the function definition 506 may include a link (e.g., 504A-C) whereby the portion(s) of the custom settings 113 from which the function definition is derived may be modified.

The function definition 506 may give a brief summary that may better enable a developer to quickly determine how the unexpected result 106 was generated. For example, the function definition 506 may include a first field providing a definition associated with the "Incompleteness Group Transaction" and the value ZSLS and a second field may providing a definition associated with the "Incompleteness Group Business Partner" and the value ZACC. According to an example embodiment, the function definition 506 may be included in or based on a function module (e.g., 130).

Although the above description is provided in terms of specific examples, it will be appreciated that many other examples and settings are contemplated. For example, the term business document should be interpreted broadly as including any document that is used in profit generation of some sort, although the business document 104 also may refer to documents for non-profit endeavors as well, including, for example, schools, churches, charities, hospitals, or virtually any other organization. Further, the business document 104 is merely an example, and other applications, such as applications for personal use, also may be used.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feed, back; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method including executing instructions stored on a non-transitory computer-readable medium using at least one processor, the method comprising:
   determining, for each object from a plurality of objects associated with a business document produced by an application, at least one function used in the production thereof;
   receiving an object selected from the plurality of objects in response to a result selector object embedded within the business document, the selected object being associated with an unexpected result in the business document;
   receiving a selected function associated with the selected object, the selected function being associated with a custom setting;
   determining a step used to produce the selected object associated with the unexpected result, the step being determined in response to a simulation based on the custom setting associated with the selected function; and
   providing a result view including the step used to produce the unexpected result, the result view including a link to a maintenance view for changing the custom setting.

2. The method of claim 1, further comprising:
   providing the business document including the unexpected result; and
   parsing the business document to determine the plurality of objects.

3. The method of claim 1, further comprising:
   providing the plurality of objects in a selection view.

4. The method of claim 1, further comprising:
   determining the selected function used in the production of the selected object; and
   providing the selected function in a selection view.

5. The method of claim 1, wherein the determining the step includes determining a data flow associated with producing the selected object based on the custom setting and the selected function.

6. The method of claim 1, wherein the step is a first step and the custom setting is a first custom setting,
   the method further comprising:
   providing, in the result view, a second step including a link to a second custom setting associated with the selected function.

7. The method of claim 1, wherein the providing is performed after the simulating and after the determining the step,
   the method further comprising:
   receiving a change of the custom setting via the maintenance view; and
   changing the unexpected result in a subsequent execution of the application.

8. A system including instructions stored on a non-transitory computer-readable storage medium, the system comprising:
   a selection view generator configured to provide a plurality of objects of a business document including an unexpected result as produced by a plurality of functions of an application based on a custom setting;
   a simulator configured to determine, based on a simulation including the custom setting and a function selected from the plurality of functions, a step used in the production of an object selected from the plurality of objects associated with the unexpected result, the object being selected from the plurality of objects in response to a result selector object embedded within the business document;
   a result view generator configured to provide the step in a result view; and
   a maintenance view generator configured to provide, upon a selection of the step and after the simulation, a maintenance view for modifying the custom setting associated with the step, the maintenance view being linked to the result view.

9. The system of claim 8, further comprising:
   a document parser configured to determine the plurality of objects based on a parsing of the business document.

10. The system of claim 8, wherein the simulator is configured to capture data processed during a simulation of the production of the selected object.

11. The system of claim 8, further comprising:
   a function module associated with the custom setting, the function module including the plurality of functions of the application.

12. The system of claim 8, further comprising
a custom settings parser configured to determine an association between the custom setting and first step based on a parsing of a plurality of custom settings.

13. The system of claim 8, wherein a modification of the custom setting changes the unexpected result in a subsequent production of the business document by the application.

14. A non-transitory computer-readable medium storing instructions that when executed cause a computer to provide an interface with multiple views, the interface comprising:
a selection view including a plurality of objects of a business document produced by a plurality of functions of an application operable based on a custom setting, the interface being configured to receive an object selected from the plurality of objects in response to a result selector object embedded within the business document and a function selected from the plurality of functions;
a result view including a plurality of steps associated with producing the selected object based on a simulation using the custom setting associated with the selected function, the interface being configured to receive a step selected from the plurality of steps; and
a maintenance view configured to provide for a modification of the custom setting associated with the selected step, the maintenance view being linked to a result view.

15. The non-transitory computer-readable medium of claim 14, wherein the interface is configured to provide the selection view responsive to a verification request received in association with the business document.

16. The system of claim 8, wherein the simulator is configured to suppress functionality of the selected function during the simulation.

17. The system of claim 8, wherein the simulator is configured to at least one of disable or replace a function call of the selected function to prevent, during the simulation, changes to master data used to produce the unexpected result.

18. The system of claim 8, wherein the selected function is a first selected function, the simulation is based on a second selected function excluded from the plurality of functions used to produce the plurality of objects.

* * * * *